JOSEPH S. MERRIKEN.
Improvement in Gas-Regulators.

No. 114,699.  Patented May 9, 1871.

United States Patent Office.

JOSEPH S. MERRIKEN, OF BALTIMORE, MARYLAND.

Letters Patent No. 114,699, dated May 9, 1871.

IMPROVEMENT IN GAS-REGULATORS.

The Schedule referred to in these Letters Patent and making part of the same.

*To all whom it may concern:*

Be it known that I, JOSEPH S. MERRIKEN, of Baltimore, in the county of Baltimore and in the State of Maryland, have invented certain new and useful Improvements in Gas-Regulators; and do hereby declare that the following is a full, clear, and exact description thereof, reference being had to the accompanying drawing and to the letters of reference marked thereon making a part of this specification.

The nature of my invention consists in the construction and arrangement of a "gas-regulator," as will be hereinafter more fully set forth.

In order to enable others skilled in the art to which my invention appertains to make and use the same, I will now proceed to describe its construction and operation, referring to the annexed drawing, in which—

A represents the cup or bowl, provided within its bottom with a central tube, B, through which the gas is admitted.

In the bottom of the bowl A is a circular flange, a, forming a circular chamber between it and the sides of the bowl, into which chamber the rim or sides of the receiver C are inserted.

In the inlet-tube B is a valve-seat, b, and a valve, d, with its stem D passing upward through the center of the receiver, and held by a nut, e.

On the upper end of the stem D above the nut e is placed a circular flange, f, upon which any desired amount of weights may be placed.

The entire bowl is covered by a cap, E.

All these parts have been used before, and I do not claim them as my invention; but heretofore the outlet-pipe G has communicated direct with the inlet-pipe B, which has been found open to many and serious objections, especially on account of the condensation and consequent loss of gas in the service-pipes.

In this case the inlet-pipe B leads uninterruptedly up into the center of the bowl, and at the side of said pipe in the bottom of the bowl is a passage, h, leading into the outlet-pipe G.

The lower end of the passage h forms a valve-seat, which is to be closed by a valve, i, and the stem of this valve is, by a rod, k, connected with the valve-stem D.

By thus disconnecting the inlet and outlet-pipes and providing the latter with an additional valve, it will readily be seen that no more gas than what is required can pass from the receiver into the outlet-pipes. And also, by this arrangement, the light will be steady and not flickering, and of the same brilliancy whether one or many burners are lighted, as only so much gas as can be used will be admitted into the pipes.

Figure 1:
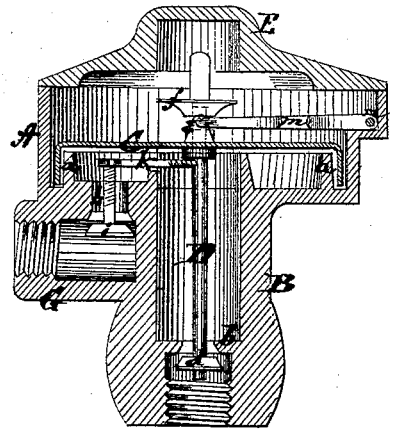
Figure 1 is a longitudinal vertical section of my gas-regulator.
Figure 2:
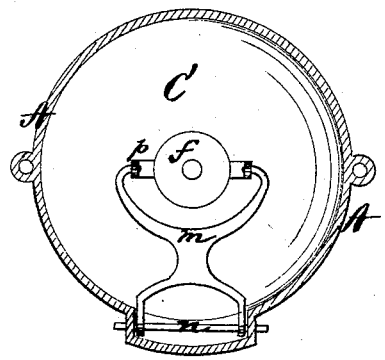
Figure 2 is a plan view of the same with the cap removed.

The nut e is formed in the center of a bar, p, the ends of which are turned up, and in said ends are pivoted the ends of a bail, m, as shown in fig. 2.

Arms from this bail extend outward so as to fit, when the bail is turned down, in a recess in the side of the bowl, where it is held by a pin, n, as shown.

Having thus fully described my invention,

What I claim as new, and desire to secure by Letters Patent, is—

The combination of the bowl A, inlet-pipe B, outlet G, passage h, receiver C, valves d i, stem D, rod k, nut e, bar p, bail m, and pin n, all constructed and arranged substantially as and for the purposes herein set forth.

In testimony that I claim the foregoing I have hereunto set my hand this 25th day of March, 1871.

J. S. MERRIKEN.

Witnesses:
   C. L. EVERT,
   A. N. MARR.